May 11, 1965     B. D. OSGOOD     3,182,606
VEHICLE ENTRY AND EXIT ASSIST STRAP AND BRACKET
Filed May 14, 1963
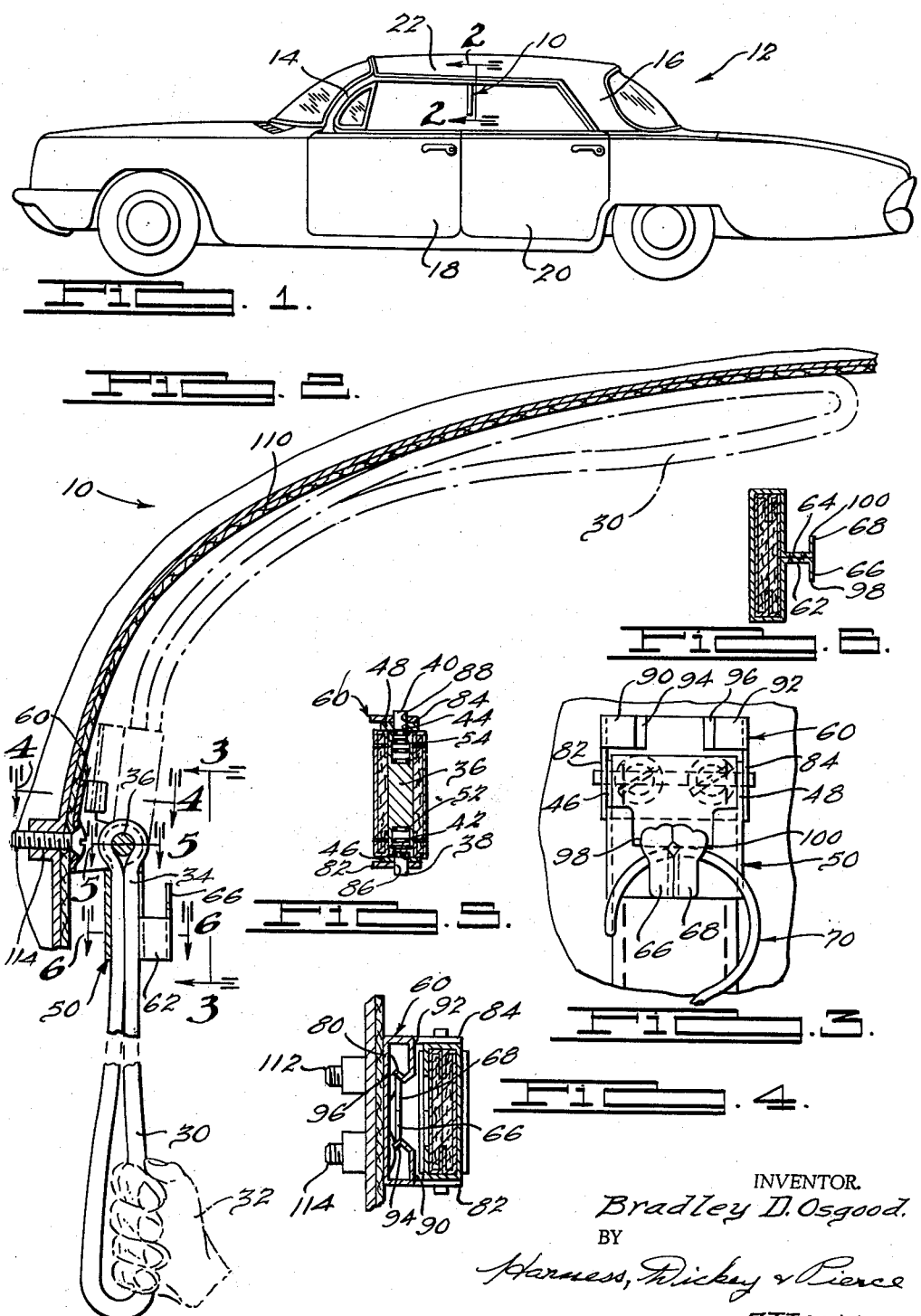
INVENTOR.
Bradley D. Osgood.
BY
Harness, Dickey & Pierce
ATTORNEYS.

3,182,606
VEHICLE ENTRY AND EXIT ASSIST
STRAP AND BRACKET
Bradley D. Osgood, 200 Tuxedo, Highland Park, Mich.
Filed May 14, 1963, Ser. No. 285,177
1 Claim. (Cl. 105—354)

This application relates generally to vehicle accessories and more particularly to a vehicle entry and exit assist strap and bracket therefor.

The advent of the automobile body style that does not have a center or "B" post on opposite sides thereof, otherwise known as a hardtop convertible, has complicated the problem of mounting an entry and exit assist strap for the convenience of passengers entering and leaving the rear seat of the automobile. It is obviously undesirable for such straps to permanently hang downwardly into the window area of a hardtop convertible as the strap destroys the aesthetic appeal of the hardtop and tends to flap outwardly of the vehicle when the windows are open. The "B" posts heretofore utilized provided a means for both supporting and concealing such passenger assist straps.

The present invention solves this problem by pivotally supporting the entry and exit assist strap for movement between a downwardly depending or operative condition and an upper or stored condition against the inner roof panel of the vehicle. The assist strap is mounted on a novel bracket that automatically locks the strap in the stored condition. The bracket also functions as a coat hook when the assist strap is in the downwardly depending or operative condition.

Accordingly, one object of the present invention is an improved entry and exit assist strap for a vehicle.

Another object is a vehicle assist strap that is movable from a downwardly depending operative position to a stored position against the roof of the vehicle.

Another object is an improved mounting bracket for a vehicle assist strap that locks the strap in the stored condition against the roof of a vehicle.

Another object is a bracket for a vehicle assist strap having a normally concealed coat hook that is moved to a functional position when the strap is in the downwardly depending condition.

Other objects and advantages of the present invention will be apparent from the following specification, claim and drawings, wherein:

FIGURE 1 is a side elevational view of a hardtop convertible;

FIG. 2 is a cross-sectional view taken substantially along the line 2—2 of FIGURE 1;

FIG. 3 is a cross-sectional view taken substantially along the line 3—3 of FIG. 2;

FIG. 4 is a cross-sectional view taken substantially along the line 4—4 of FIG. 2;

FIG. 5 is a cross-sectional view taken substantially along the line 5—5 of FIG. 2; and FIG. 6 is a cross-sectional view taken substantially along the line 6—6 of FIG. 2.

Referring to FIGURE 1 of the drawings, a vehicle entry and exit assist strap 10 is shown operatively associated with a hardtop convertible automobile 12. The strap 10 is shown in the downwardly depending or operative condition. The automobile 12 is conventional in construction and comprises a windshield or "A" post 14 and a rear or "C" post 16. The term "hardtop" convertible for the automobile 12 is derived from the absence of an intermediate post that extends upwardly from a position between the front and rear door panels 18 and 20, respectively, towards the roof portion 22 of the automobile 12.

As best seen in FIGS. 2–6, the vehicle assist strap 10 comprises a strap portion 30, preferably of woven material, for example, nylon, formed in a loop to accommodate a passenger's hand 32. An upper end portion 34 of the loop 30 is disposed about an extensible pin 36, opposite end portions 38 and 40 of which extend through complementary apertures 42 and 44, respectively, in a pair of upstanding ears 46 and 48 of a clip 50. The end portions 38 and 40 of the pin 36 are normally biased outwardly as by a pair of helical compression springs 52 and 54, respectively, thereby to provide for retraction of the end portions 38 and 40 to facilitate assembly of the loop 30 with the clip 50 and of the clip 50 with a mounting bracket 60, as will be described.

The clip 50 is folded about the end portion 34 of the loop 30, end portions 62 and 64 thereof being joined in juxtaposed relationship as by welding. The end portions 62 and 64 have terminal flange portions 66 and 68 thereon, respectively, that extend normally to the end portions 62 and 64 and generally opposite to one another.

As best seen in FIG. 2, the terminal flange portions 66 and 68 of the clip 50 extend upwardly above the end portions 62 and 64, thereby to define a hook for the acceptance of a conventional coat hanger 70 (FIG. 3) when the assist strap 10 is in the downwardly depending or operative condition.

As best seen in FIG. 4, the mounting bracket 60 is of generally U-shaped horizontal cross section defined by a bight portion 80 having a pair of laterally extending legs 82 and 84. The legs 82 and 84 have suitable apertures 86 and 88 (FIG. 5) for the acceptance of the end portions 38 and 40 of the pin 36. As noted hereinbefore, the end portions 38 and 40 of the pin 36 are retractable against the springs 52 and 54, respectively, to facilitate entry thereof through the apertures 86 and 88.

The bracket 60 has a pair of folded latch fingers 90 and 92 with reentrantly folded terminal end portions 94 and 96, respectively, they are spaced apart a distance slightly less than the spacing between opposite edge portions 98 and 100 on the ears 66 and 68 of the clip 50 so that, upon movement of the ears 66 and 68 past the reentrantly folded terminal end portions 94 and 96, the portions 94 and 96 flex apart to accept the edge portions 98 and 100 of the ears 66 and 68 thence snap to their normal condition to retain the ears 66 and 68. Thus, the terminal end portions 94 and 96 of the latch fingers 90 and 92 on the bracket 60 function as snap retainers for the clip 50 to hold the clip 50 and loop 30 in the upper or stored condition shown in broken liens in FIG. 2.

The mounting bracket 60 is secured to, for example, a roof rib 110 as by a pair of machine screws 112 and 114.

From the foregoing description, it should be apparent that the vehicle entry and exit assist strap 10 of the instant invention is relatively simple in construction yet positive in operation. The loop portion 30 is lockable in an upwardly or stored condition by positive snap-engagement of the clip 50 with the bracket 60. The assist strap 10 is easily pulled to the downwardly depending or operative condition by simply pulling downwardly on the loop portion 30 thereof to spring the ears 66 and 68 past the resilient end portions 94 and 96 of the latch fingers 90 and 92.

The ears 66 and 68 on the clip 50 also serve as a hook for the acceptance of the conventional coat hanger 70 when the loop portion 30 of the assist strap 10 is in the downwardly depending condition.

It is to be understood that the specific construction of the improved vehicle entry and exit assist strap and bracket herein disclosed and described is presented for the purpose of explanation and illustration and is not intended to indicate limits of the invention, the scope of which is defined by the following claim.

What is claimed is:

In a passenger vehicle having a roof panel, a retractable combination entry and exit assist strap and coat hanger comprising a mounting bracket supported by the vehicle roof panel, a pair of longitudinally spaced resilient fingers on said mounting bracket, a strap clip pivotally supported by said bracket for rotation about a horizontal axis generally parallel to a longitudinal axis of the vehicle between a downwardly extending operative position and an upwardly extending retracted position, a hand strap secured to said strap clip, and means on said strap clip resiliently latchable between the fingers on said bracket for locking said hand strap in the upwardly extending retracted condition against the roof panel of the vehicle, said locking means comprising a coat hanger when said assist strap is in the downwardly extending position.

References Cited by the Examiner
UNITED STATES PATENTS

| | | | |
|---|---|---|---|
| 989,237 | 4/11 | Doyle | 105—354 |
| 1,837,380 | 12/31 | Tonkinson | 248—293 |
| 1,999,958 | 4/35 | Clark | 105—354 |

LEO QUACKENBUSH, *Primary Examiner.*